US011905152B2

(12) United States Patent
Bangalore Srinivas et al.

(10) Patent No.: US 11,905,152 B2
(45) Date of Patent: Feb. 20, 2024

(54) ADJUSTABLE COUNTERWEIGHT-BASED FORK TYPE AUTONOMOUS MOBILE ROBOT

(71) Applicant: Tata Consultancy Services Limited, Mumbai (IN)

(72) Inventors: Venkatesh Prasad Bangalore Srinivas, Bangalore (IN); Pradeepak Rajendran, Bangalore (IN); Sreehari Kumar Bhogineni, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/815,755

(22) Filed: Jul. 28, 2022

(65) Prior Publication Data

US 2023/0211989 A1 Jul. 6, 2023

(30) Foreign Application Priority Data

Jan. 4, 2022 (IN) ............................ 202221000369

(51) Int. Cl.
*B66F 9/075* (2006.01)
*B66F 9/06* (2006.01)

(52) U.S. Cl.
CPC .......... *B66F 9/07554* (2013.01); *B66F 9/063* (2013.01); *B66F 9/07531* (2013.01)

(58) Field of Classification Search
CPC ........ B66F 9/07554; B66F 9/087; B66F 9/08; B66F 7/0608; B66F 7/025
See application file for complete search history.

(56) References Cited

U.S. PATENT DOCUMENTS 2,693,250 A * 11/1954 Barrett ................ B66F 9/07554 180/908
3,687,484 A * 8/1972 Cosby ................. B66F 9/07554 414/572

(Continued)

FOREIGN PATENT DOCUMENTS

CN 107188086 A * 9/2017
CN 107757751 A 3/2018

(Continued)

OTHER PUBLICATIONS

Machine Translation of CN 114229737.*

*Primary Examiner* — Diem M Tran
(74) *Attorney, Agent, or Firm* — FINNEGAN, HENDERSON, FARABOW, GARRETT & DUNNER LLP

(57) ABSTRACT

Traditionally, counterweight fork type autonomous mobile robots (AMR) have been used for any kind of pallet. But the challenge is it occupies lot more maneuvering space while making turns, which cannot work in narrow operating zones. Hence fork over AMR is preferred. However, these fork over AMR have extended parts always touching the ground surface and thus are not suitable for pallets with a wooden plank at the bottom of the fork opening in the pallet. To overcome the above technical problems, an Adjustable Counterweight-based Fork Type Autonomous Mobile Robot (ACFTAMR) is provided that includes chassis assembly and vertical mast unit, a horizontal cross slide mechanism and forks. The chassis assembly is provided counterweight assembly and counterbalance shafts that move forward and backward during pickup and release of payload when the vertical mast unit moves in upward/downward direction, thus providing better stability and counterbalance to the ACFTAMR.

7 Claims, 13 Drawing Sheets

(56) References Cited

U.S. PATENT DOCUMENTS

| | | | | | |
|---|---|---|---|---|---|
| 3,734,326 | A * | 5/1973 | Esser | B66F 9/07554 | |
| | | | | 414/673 | |
| 4,221,530 | A * | 9/1980 | Williams, IV | B66F 17/003 | |
| | | | | 414/673 | |
| 10,953,555 | B2 | 3/2021 | Altman et al. | | |
| 2020/0307974 | A1 | 10/2020 | Hasegawa et al. | | |
| 2021/0403103 | A1 * | 12/2021 | Alshaalan | B62D 37/04 | |

FOREIGN PATENT DOCUMENTS

| | | | | | |
|---|---|---|---|---|---|
| CN | 108773799 | A | * | 11/2018 | B66F 9/07554 |
| CN | 209306892 | U | * | 8/2019 | |
| CN | 111362194 | A | * | 7/2020 | |
| CN | 112408269 | A | * | 2/2021 | |
| CN | 112499523 | A | * | 3/2021 | |
| CN | 113086895 | A | * | 7/2021 | |
| CN | 113803522 | A | * | 12/2021 | |
| CN | 113929024 | A | * | 1/2022 | |
| CN | 114229737 | A | * | 3/2022 | |
| CN | 115072627 | A | * | 9/2022 | |
| CN | 115180559 | A | * | 10/2022 | |
| CN | 115520813 | A | * | 12/2022 | |
| DE | 102006060325 | A1 | | 6/2008 | |
| GB | 2355244 | A | * | 4/2001 | B66F 9/07554 |
| KR | 101552554 | B1 | * | 9/2015 | |
| KR | 20200120312 | A | * | 10/2020 | |
| KR | 20220022552 | A | * | 2/2022 | |

* cited by examiner

ADJUSTABLE COUNTERWEIGHT-BASED FORK TYPE AUTONOMOUS MOBILE ROBOT

PRIORITY CLAIM

This U.S. patent application claims priority under 35 U.S.C. § 119 to: Indian Patent Application No. 202221000369, filed on Jan. 4, 2022. The entire contents of the aforementioned application are incorporated herein by reference.

TECHNICAL FIELD

The disclosure herein generally relates to Autonomous Mobile Robot (AMR), and, more particularly, to Adjustable Counterweight-based Fork Type Autonomous Mobile Robot (ACFTAMR).

BACKGROUND

Traditionally, various forklift types have been made available in the market for automated guided vehicles (AGVs) and autonomous mobile robots (AMRs). Generally, these are of broadly two types fork over and counterbalance. However, there are other types available. Application of these robots are huge in logistic warehouses and smart factories postal industries across the world. All factories/manufacturing units are leading to adoption of AGVs and AMRs to act as smart factory and to achieve increased safety, reduction in infrastructure cost, and improved production time. Smart trend is growing implementation of mobile robots in the factories, warehouses, and logistics areas worldwide to increase the productivity at the work.

Fork over type AGVs/AMRs are more compact compared to counterbalance type of AGVs/AMRs. Most of the forklift AMRs in market have mast mechanism for lifting the forks. These mast mechanism and counterbalance type AGVs/AMRs increase the footprints of the overall vehicle and vehicle becomes bulky. It is therefore imperative for logistics manufacturing units/organizations to demand for compact and multi-purpose forklift AMRs for optimally utilize their environment space and to achieve speedy handling of both stringer and non-stringer pallet types.

SUMMARY

Embodiments of the present disclosure present technological improvements as solutions to one or more of the above-mentioned technical problems recognized by the inventors in conventional systems. For example, in one aspect, there is provided an adjustable counterweight-based fork type autonomous mobile robot. The adjustable counterweight-based fork type autonomous mobile robot comprises a chassis assembly; a mast unit that is held by the chassis assembly, wherein the mast unit comprises: a fork mount comprising a first end and a second end, wherein the fork mount is configured to accommodate a plurality of forks using a plurality of fasteners; a first vertical plate and a second vertical plate; a first set of Liner Motion (LM) rails mounted on the first vertical plate and the second vertical plate respectively; and a vertical lead screw mechanism comprising a first end and a second end, wherein the first end of the vertical lead screw mechanism is connected to the fork mount, and wherein the vertical lead screw mechanism is configured to drive the fork mount in at least one of a first direction and a second direction; a counterweight assembly comprising a counterweight having a first end and a second end, each of the first end and the second end of the counterweight assembly comprise a plurality of cutouts, wherein the counterweight assembly comprises: a first pair of counterbalance shafts and a second pair of counterbalance shafts, wherein each counterbalance shaft from the first pair and the second pair of counterbalance shafts comprise a corresponding flange, wherein each cutout from the plurality of cutouts is configured to accommodate the corresponding flange, wherein during a pickup of a payload by the plurality of forks, (i) the plurality of shafts are configured to change from a first position to a second position, (ii) upon the plurality of shafts changing from the first position to the second position, each of the plurality of forks are configured to slide through a corresponding fork assembly receiver of the payload, and (iii) the fork mount is driven from the first direction to the second direction via the first set of Liner Motion (LM) rails, for lifting the payload by the plurality of forks, and wherein upon lifting the payload on the plurality of forks, the plurality of shafts are configured to change from the second position to the first position to operate the adjustable counterweight-based fork type autonomous mobile robot for navigation to a desired location.

In an embodiment, the vertical lead screw mechanism is equidistantly positioned between the first vertical plate and the second vertical plate.

In an embodiment, wherein when the payload is to be released from the plurality of forks to the desired location, (i) the plurality of shafts are configured to change from the first position to the second position, and (ii) the fork mount is driven from the second direction to the first direction.

In an embodiment, the adjustable counterweight-based fork type autonomous mobile robot of further comprises a steer and drive unit comprising: a rack and pinion assembly comprising a mounting block having a first side and a second side; a second set of LM rails, each LM rail of the second set of LM rails is mounted on an inner surface of the first side and the second side respectively; a plurality of LM blocks, each LM block from the plurality of LM blocks is configured to slide on a corresponding LM rail from the second set of LM rails; a first rack and a second rack mounted on a corresponding LM block; a driver pinion positioned at the center and in between the first rack and the second rack, and driven by a motor; a first driven pinion and a second driven pinion, each of the first driven pinion and the second driven pinion positioned in between the first rack and the second rack such that the first driven pinion and the second driven pinion are on either side of the driver pinion, wherein the motor is configured to (i) rotate the driver pinion, the first driven pinion and the second driven pinion in at least one direction, (ii) enable rotation of a plurality of drive wheels in the at least one direction attached to the first driven pinion and the second driven pinion.

In an embodiment, the steer and drive unit further comprises a plurality of suspension units, wherein each suspension unit from the plurality of suspension units is configured to provide suspension for the plurality of drive wheels during navigation of the adjustable counterweight-based fork type autonomous mobile robot.

In an embodiment, the adjustable counterweight-based fork type autonomous mobile robot further comprises a battery unit mounted on the chassis, wherein the battery unit is configured to accommodate a battery for providing power to the adjustable counterweight-based fork type autonomous mobile robot.

In an embodiment, the battery unit comprises: a plurality of stand-offs, wherein each stand-off comprises a first end and a second end, wherein the first end of each stand-off is connected to a corresponding corner point of the battery unit; a first support link connected to the second end of a first stand off and a second stand-off of the plurality of stand-offs; a second support link connected to the second end of a third stand off and a fourth stand-off of the plurality of stand-offs; a first L-shaped guide and a second L-shaped guide, each of the first L-shaped guide and the second L-shaped comprise a first end and a second end, wherein the first end of the first L-shaped guide and the second L-shaped is fixed to a corresponding corner plate mounted on the chassis; and a sliding door operated by a positioning actuator, wherein the sliding door is configured to (i) slide through the first L-shaped guide and the second L-shaped for open and close of the battery unit; a first battery aligning component and a second battery aligning component, each of the first battery aligning component and the second battery aligning component comprising a first portion and a second portion, wherein the first portion of the first battery aligning component and the second battery aligning component is connected to the first stand-off and the third stand-off respectively, and wherein the second portion of the first battery aligning component and the second battery aligning component is connected to the second stand-off and the fourth stand-off to form a tapered area.

In an embodiment, the battery unit further comprises: a plurality of telescopic rails connected to the chassis; and a ball plate mounted on the plurality of telescopic rails connected to the chassis.

In an embodiment, the plurality of telescopic rails are configured to provide a guided pathway for the ball plate to enable a battery to slide inside or outside of the battery unit via the formed tapered areas.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
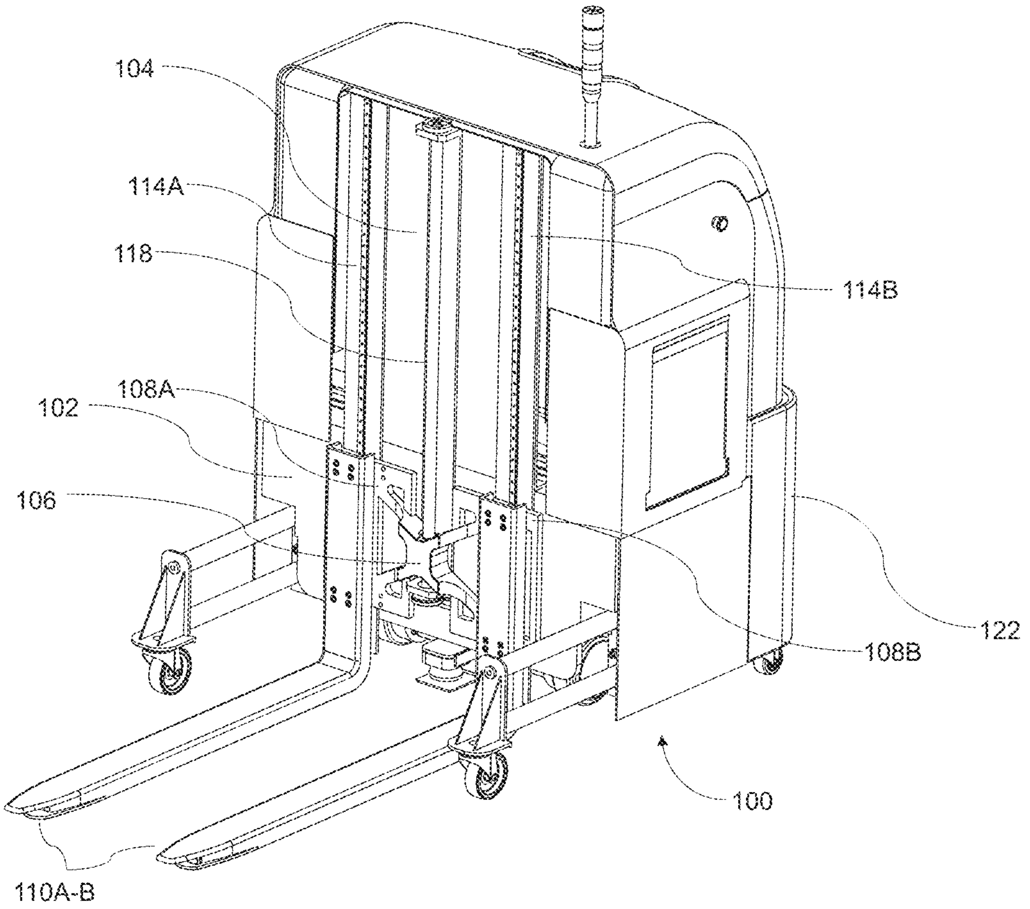
FIG. 1A depict a first view of an exemplary adjustable counterweight-based fork type autonomous mobile robot (ACFTAMR), in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

Reference numerals of one or more components of the Adjustable counterweight-based fork type autonomous mobile robot (ACFTAMR) as depicted in the FIGS. 1A through 7 are provided in Table 1 below for ease of description:

TABLE 1

| SI. No | Component | Numeral reference |
|---|---|---|
| 1 | Adjustable counterweight-based fork type autonomous mobile robot (ACFTAMR) | 100 |
| 2 | Chassis assembly | 102 |
| 3 | Mast unit | 104 |
| 4 | Fork mount | 106 |
| 5 | First end and a second end of the fork mount | 108A-B |
| 6 | A plurality of forks | 110A-B |
| 7 | A plurality of fasteners | 112A-N |
| 8 | First vertical plate and a second vertical plate | 114A-B |
| 9 | First set of Liner Motion (LM) rails | 116A-B |
| 10 | Vertical lead screw mechanism | 118 |
| 11 | First end and a second end of the vertical lead screw mechanism | 120A-B |
| 12 | Counterweight assembly | 122 |
| 13 | Counterweight | 123 |
| 14 | first end and a second end of the Counterweight assembly | 124A-B |
| 15 | A plurality of cutouts | 126A-N |
| 16 | A first pair of counterbalance shafts | 128A-B |
| 17 | A second pair of counterbalance shafts | 128C-D |
| 18 | Corresponding flange | 130A-D |
| 19 | Steer and drive unit | 132 |
| 20 | Rack and pinion assembly | 134 |
| 21 | Mounting block | 136 |

TABLE 1-continued

| SI. No | Component | Numeral reference |
|---|---|---|
| 22 | a first side and a second side of the mounting block | 138A-B |
| 23 | A second set of LM rails | 140A-B |
| 24 | A plurality of LM blocks | 142A-B |
| 25 | A first rack and a second rack | 144A-B |
| 26 | A driver pinion | 146 |
| 27 | Motor | 148 |
| 28 | A first driven pinion and a second driven pinion | 150A-B |
| 29 | A plurality of drive wheels | 152A-B |
| 30 | A plurality of suspension units | 154A-N |
| 31 | Battery unit | 156 |
| 32 | A plurality of stand-offs | 158A-D |
| 33 | A first end and a second end of each stand-off | 160A-B |
| 34 | First support link and second support link | 162A-B |
| 35 | First L-shaped guide and a second L-shaped guide | 164A-B |
| 36 | First end and a second end of the first L-shaped guide and a second L-shaped guide | 166A-B |
| 37 | Sliding door | 168 |
| 39 | First battery aligning component and second battery aligning component | 172A-B |
| 40 | First portion and a second portion | 174A-B |
| 41 | A plurality of telescopic rails | 176A-B |
| 42 | A ball plate | 178 |
| 43 | Battery | 180 |

Figure 1B:
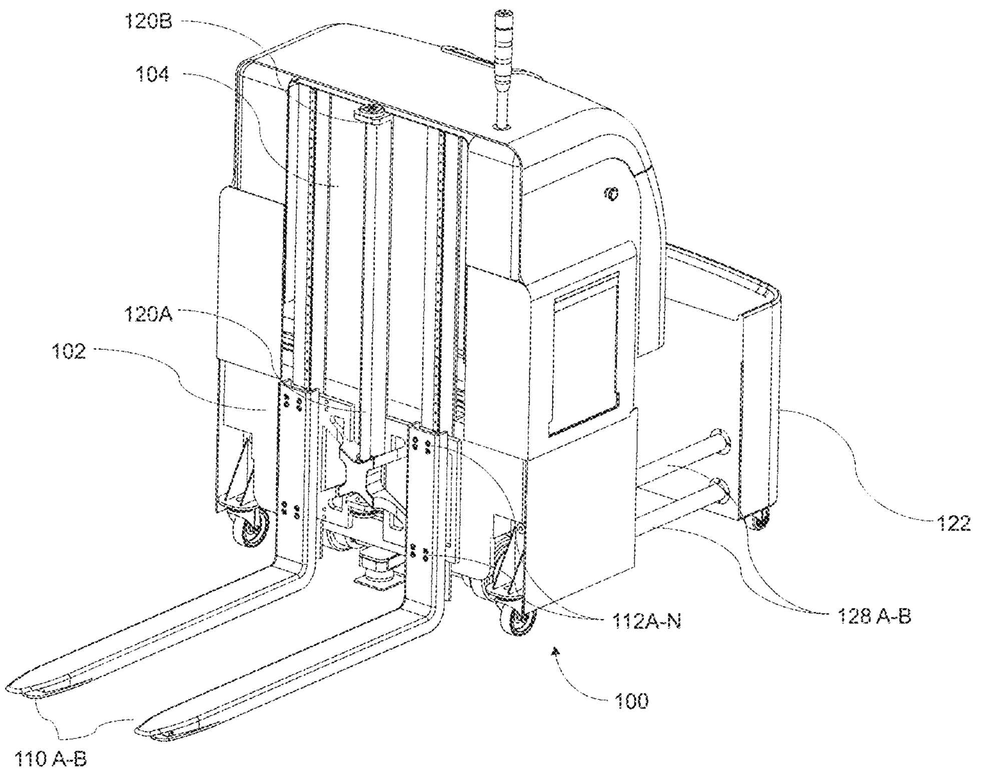
FIG. 1B depict a second view of an exemplary adjustable counterweight-based fork type autonomous mobile robot (ACFTAMR), in accordance with an embodiment of the present disclosure.
Figure 1C:
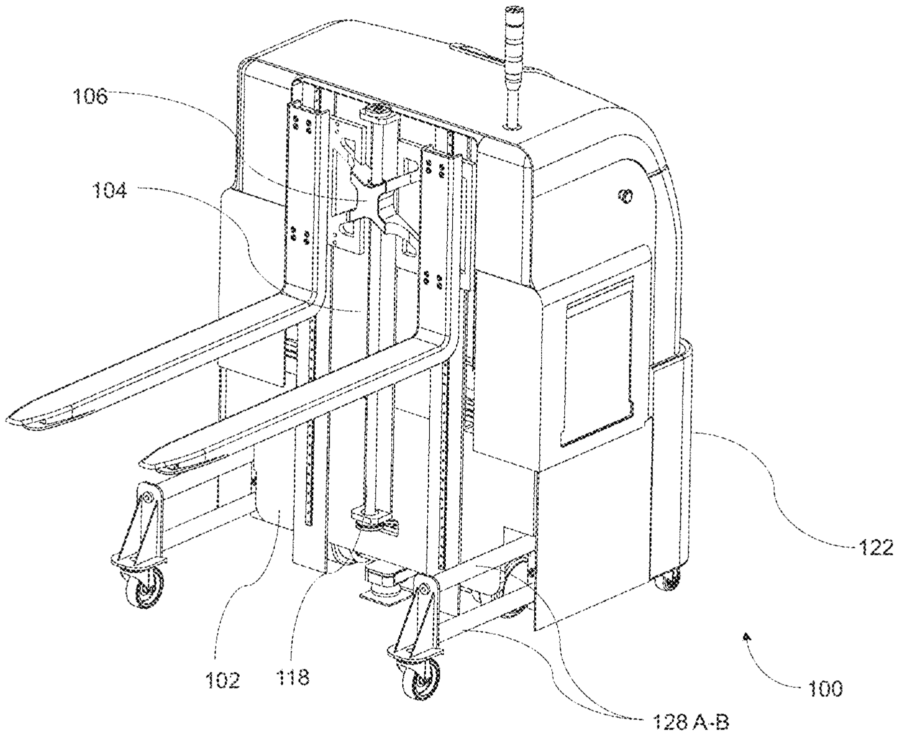
FIG. 1C depict a third view of an exemplary adjustable counterweight-based fork type autonomous mobile robot (ACFTAMR), in accordance with an embodiment of the present disclosure.
Figure 2A:
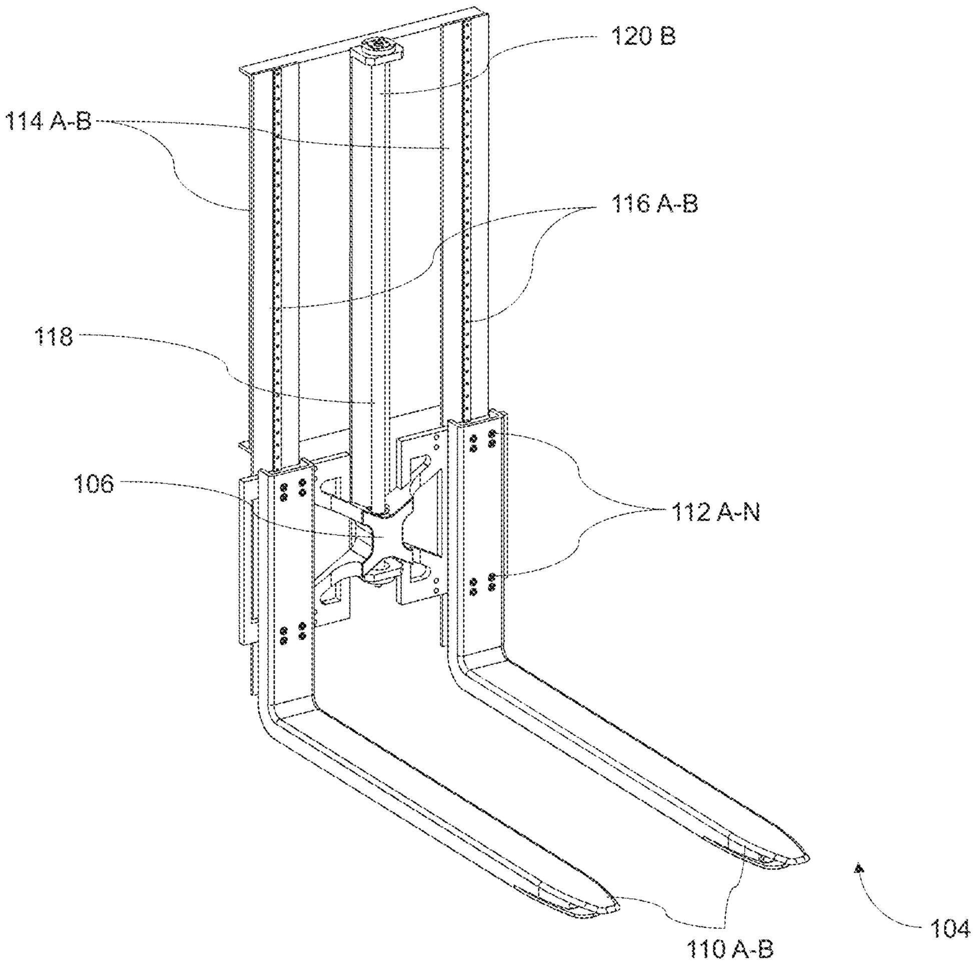
FIGS. 2A and 2B depict a mast unit comprised in the ACFTAMR, in accordance with an embodiment of the present disclosure.
Figure 2B:
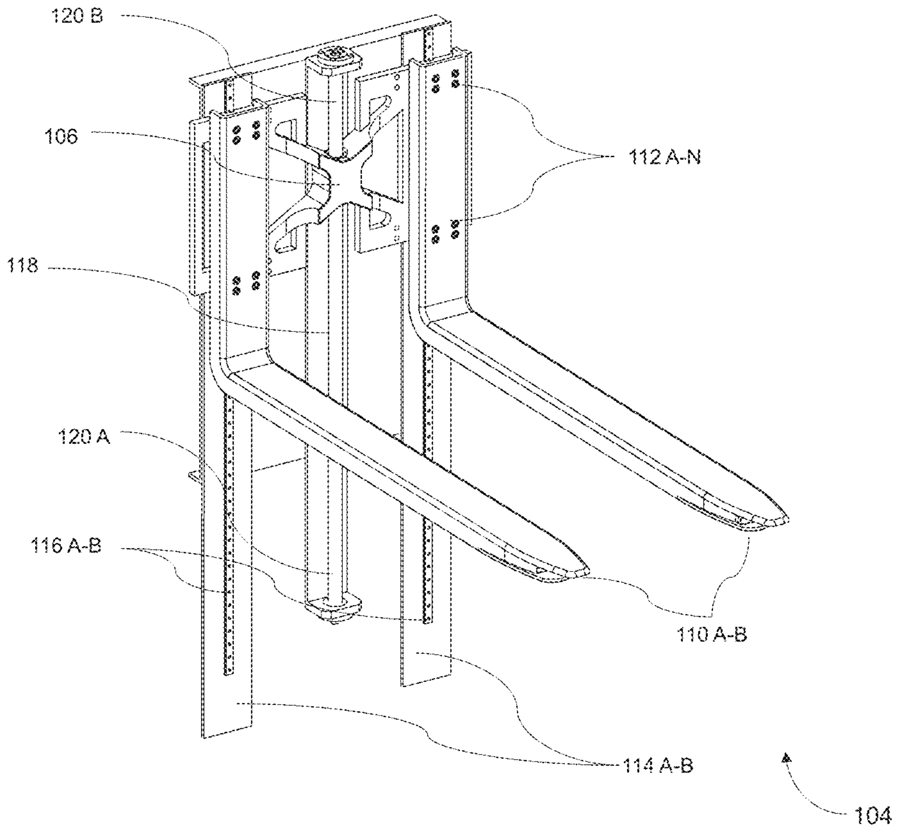

FIGS. 1A through 1C depict an exemplary adjustable counterweight-based fork type autonomous mobile robot (ACFTAMR) 100, in accordance with an embodiment of the present disclosure. More specifically, FIGS. 1A through 1C, depict a perspective view of the adjustable counterweight-based fork type autonomous mobile robot (ACFTAMR) 100, in accordance with an embodiment of the present disclosure. In an embodiment, the adjustable counterweight-based fork type autonomous mobile robot (ACFTAMR) may also be referred as 'apparatus', AMR, and may be interchangeably used herein. The ACFTAMR 100 comprises a chassis assembly 102, and a mast unit 104. The chassis assembly 102 is configured to hold the mast unit 104. Alternatively, the mast unit 104 is held by the chassis assembly 102. The chassis assembly 102 is configured to serve as a base part on which all other subunits/components of the ACFTAMR 100 are mounted. The chassis assembly 102 consists of four pathways in which plurality of bearings are mounted from both the sides of the holes. These pathways are configured to provide support to a plurality of counterbalance shafts. The chassis assembly 102 is a C type chassis assembly in an embodiment of the present disclosure. The chassis assembly 102 is provided with plurality of ribs for providing rigidness in the part/components of the ACFTAMR 100 and to avoid the buckling.

The mast unit 104 comprises a fork mount 106 having a first end 108A and a second end 108B. The fork mount 106 is configured to accommodate a plurality of forks 110A-B using a plurality of fasteners 112A-N at each of the first end (108A) and the second end (108A). The mast unit 104 further comprises a first vertical plate 114A and a second vertical plate 114B. The mast unit 104 further comprises a first set of Liner Motion (LM) rails 116A-B wherein the first set of Liner Motion (LM) rails 116A-B is mounted on the first vertical plate 114A and the second vertical plate 114B respectively. For instance, the first LM rail 116A of the first set of Liner Motion (LM) rails 116A-B is mounted on the first vertical plate 114A and the second LM rail 116B of the first set of Liner Motion (LM) rails 116A-B is mounted on the second vertical plate 114B.

Figure 3A:
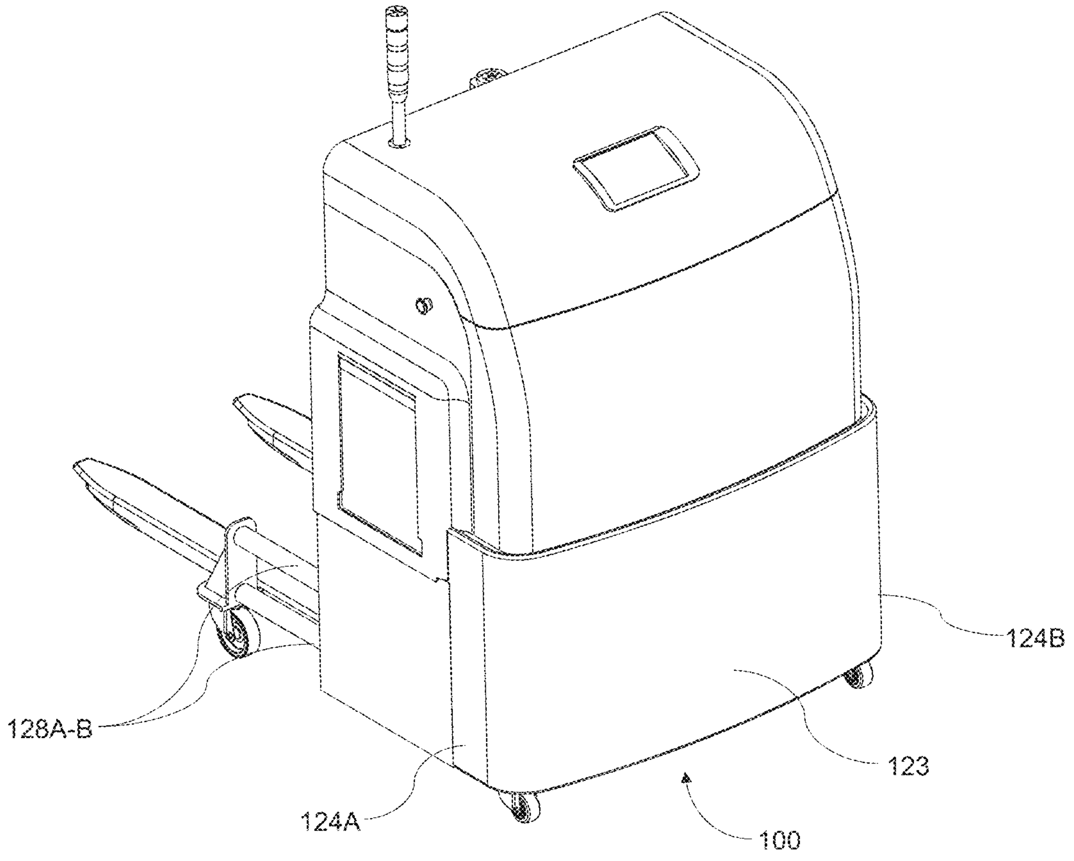
FIGS. 3A and 3B depict a rear perspective view of the ACFTAMR with the counterweight assembly in a collapse position and an expanded position respectively.
Figure 3B:
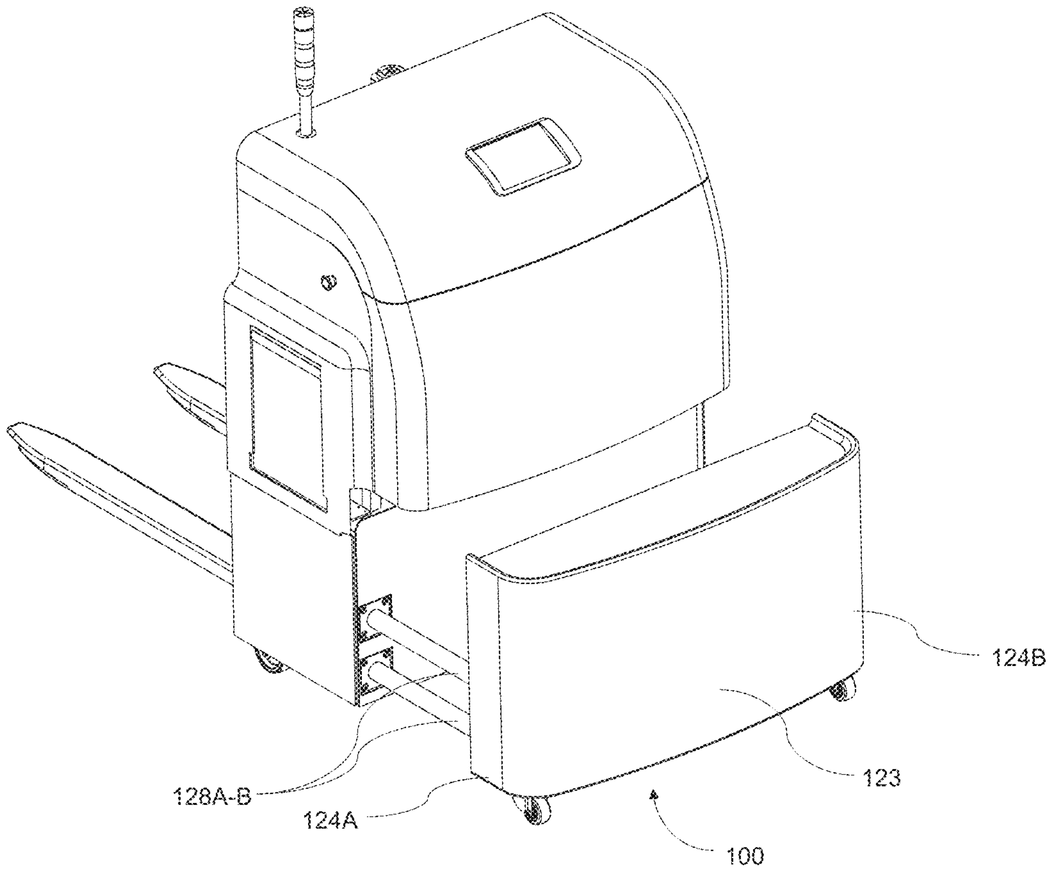
Figure 4A:
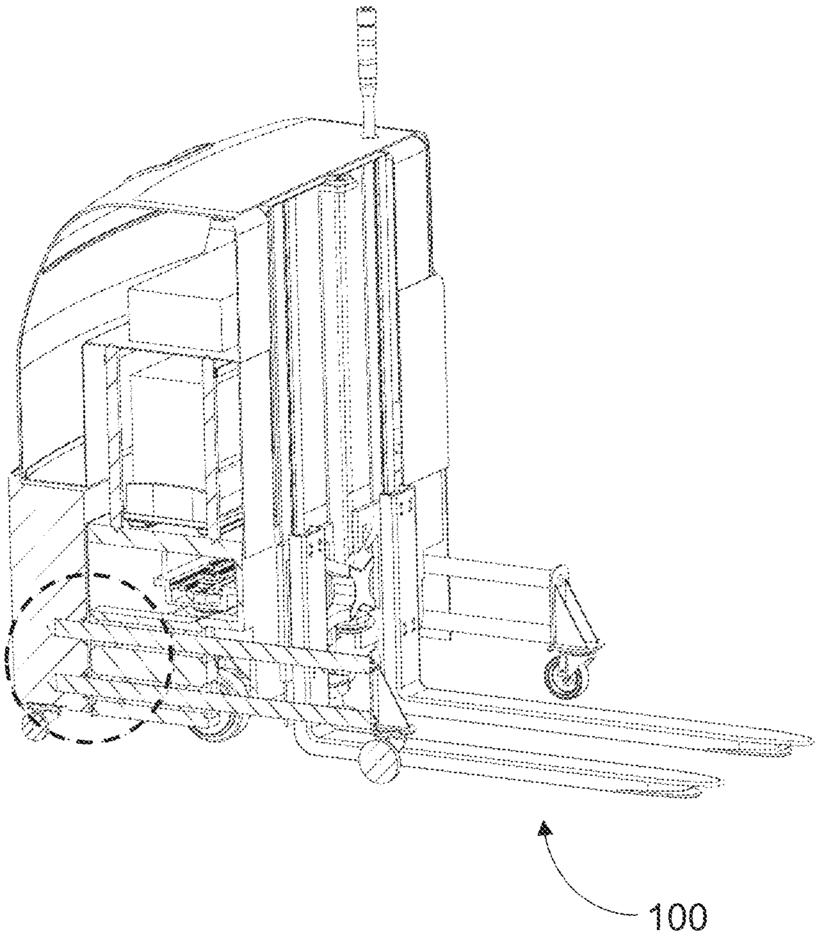
FIG. 4A depicts a cross sectional view of the ACFTAMR illustrating a plurality of cutouts and flanges represented within a broken line circle, in accordance with an embodiment of the present disclosure.
Figure 4B:
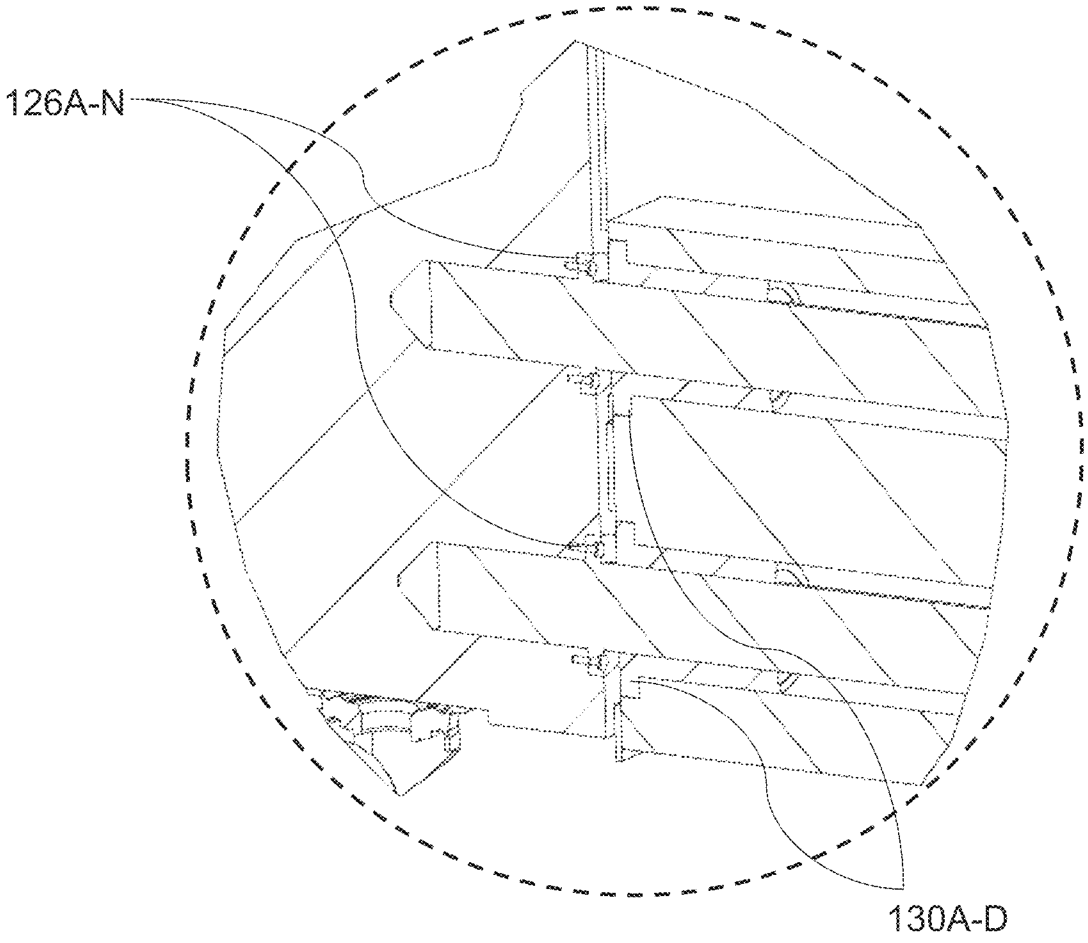
FIG. 4B depicts a detailed view of the plurality of cutouts and the plurality of flanges of the ACFTAMR comprised in the broken line circle, in accordance with an embodiment of the present disclosure.

The mast unit 104 further comprises a vertical lead screw mechanism 118 having a first end 120A and a second end 120B. The vertical lead screw mechanism 118 is equidistantly positioned between the first vertical plate 114A) and the second vertical plate 114B as shown in FIG. 2. More specifically, FIG. 2, with reference to FIGS. 1A through 1C, depicts the mast unit 104 comprised in the ACFTAMR 100, in accordance with an embodiment of the present disclosure. The first end 120A of the vertical lead screw mechanism 120A is connected to the fork mount 106. The vertical lead screw mechanism 118 is configured to drive the fork mount 106 in at least one of a first direction, and a second direction. For instance, the first direction is a downward direction, and the second direction is an upward direction, in an embodiment of the present disclosure. Such movement of the fork mount 106 in either directions is achieved when the vertical lead screw mechanism 118 is moved in the downward or upward direction during a specific operation along with the first set of LM rails 116A-B, wherein the vertical lead screw mechanism 118 is operated to move in either directions, and driven by a corresponding motor (not shown in FIGS.). The ACFTAMR 100 further comprises a counterweight assembly 122 wherein the counterweight assembly 122 comprises a counterweight 123 comprising a first end 124A and a second end 124B. Each of the first end 124A and the second end 124B of the counterweight assembly 122 comprises a plurality of cutouts 126A-N. The counterweight assembly 122 comprises a first pair of counterbalance shafts 128A-B and a second pair of counterbalance shafts 128C-D. For instance, the first pair of counterbalance shafts 128A-B and the second pair of counterbalance shafts 128C-D are fitted on either side of the chassis assembly 102. Each counterbalance shaft from the first pair and the second pair of counterbalance shafts 128A-D comprises a corresponding flange 130A-D. For instance, the counterbalance shaft 128A comprises a flange 130A and the counterbalance shaft 128B comprises a flange 130B. Similarly, the counterbalance shaft 128C comprises a flange 130C and the counterbalance shaft 128D comprises a flange 130D. Each corresponding cutout from the plurality of cutouts 126A-N is configured to accommodate the corresponding flange 128A-D. For instance, a cutout 126A which is part of the chassis assembly 102 is configured to accommodate the flange 128A, and a cutout 126B is configured to accommodate the flange 128B. Similarly, cutouts 126C-N are configured to accommodate the flanges 128C and 128N respectively. FIG. 3A-3B, with reference to FIGS. 1A through 2, depicts a rear perspective view of the ACFTAMR 100 with the counterweight assembly in an expanded and collapse position respectively, in accordance with an embodiment of the present disclosure. More specifically, FIG. 3A depicts the ACFTAMR 100 illustrating counterbalance shafts (e.g., the first pair counterbalance shafts 128A-D) and the counterweight assembly 122 comprising the counterweight 123 having the first end 124A and the second end 124B, wherein the counterweight assembly 122 is in a collapsed position, in accordance with an embodiment of the present disclosure. More specifically, FIG. 3B depicts the ACFTAMR 100 illustrating counterbalance shafts (e.g., the first pair counterbalance shafts 128A-D) and the counterweight assembly 122 comprising the counterweight 123 having the first end 124A and the second end 124B, wherein the counterweight assembly 122 is in an expanded position, in accordance with an embodiment of the present disclosure. FIG. 4A, with reference to FIGS. 1A through 3B, depicts a cross sectional view of the ACFTAMR 100, in accordance with an embodiment of the present disclosure. More specifically, FIG. 4A depicts a cross sectional view of the ACFTAMR illustrating the plurality of cutouts 126A-N and flanges 128A-D, represented within a broken line circle, in accordance with an embodiment of the present disclosure. FIG. 4B, with reference to FIGS. 1A through 4A, depicts a detailed view of the plurality of cutouts 126A-N and flanges 128A-D of the ACFTAMR 100 comprised in the broken line circle, in accordance with an embodiment of the present disclosure.

During a pickup a payload by the plurality of forks 110A-B, (i) the first pair and the second pair of counterbalance shafts 128A-D are configured to change from a first position to a second position (e.g., from collapsed position to expanded position as shown in FIG. 3B), (ii) upon the plurality of the first pair and the second pair of counterbalance shafts 128A-D changing from the first position to the second position, each of the plurality of forks 110A-B is configured to slide through a corresponding fork assembly receiver of the payload (the receiver of the payload is not shown in FIGS.), and (iii) the fork mount 106 is driven from the first direction (e.g., downward direction) to the second direction (e.g., upward direction) via the first set of Liner Motion (LM) rails 116A-B, for lifting the payload by the plurality of forks 110A-B. Direction of fork mount 106 driven from the first direction (e.g., downward direction) to the second direction (e.g., upward direction) is depicted in FIG. 1C. This can also be realized in FIG. 2B, wherein the fork mount 106 is moved at the top or upward direction. Further, upon lifting the payload on the plurality of forks 110A-B, the first pair and the second pair of counterbalance shafts 126A-D are configured to change from the second position (e.g., from expanded position) to the first position (e.g., to collapse position) and the ACFTAMR 100 is operated for navigation to a desired location. The change of expanded position to collapsed position of the shafts is depicted in FIG. 3A. One or more sensors/cameras as known in the art may be mounted on the ACFTAMR 100 to help navigate and detecting the payload and corresponding fork assembly receiver of the payload. Once detected, the pickup operation as described above is performed by the ACFTAMR 100.

When the payload is to be released from the plurality of forks 110A-B to the desired location, (i) the first pair and the second pair of counterbalance shafts 128A-D are configured to change from the first position to the second position, and (ii) the fork mount 106 is driven from the second direction to the first direction. Such movement is depicted in FIGS. 1A and 1B. This can also be realized in FIG. 2A where the fork mount is at an initial/downward direction.

Figure 5:
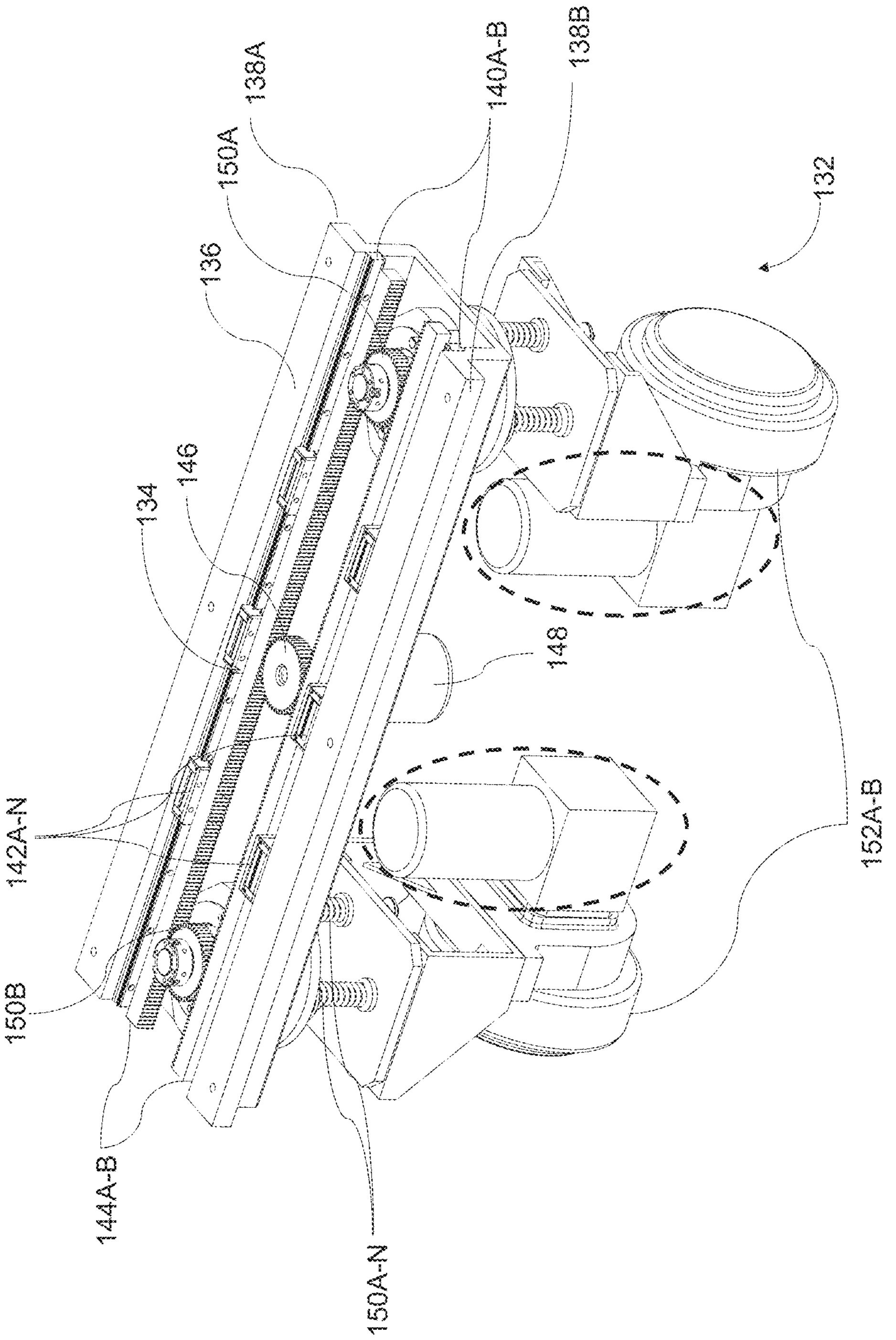
FIG. 5 depicts a steer and drive unit comprised in the ACFTAMR, in accordance with an embodiment of the present disclosure.

The ACFTAMR 100 further comprises a steer and drive unit 132. FIG. 5, with reference to FIGS. 1A through 4B, depicts the steer and drive unit comprised in the ACFTAMR 100, in accordance with an embodiment of the present disclosure. The steer and drive unit 132 comprises a rack and pinion assembly 134 which includes a mounting block 136. The mounting block 136 comprises a first side 138A and a second side 138B. The steer and drive unit 132 further comprises a second set of LM rails 140A-B. Each LM rail from the second set of LM rails 140A-B is mounted on an inner surface of the first side 138A and the second side 138B of the mounting block 136 respectively. In other words, the LM rail 140A is mounted on an inner surface of the first side 138A and the LM rail 140B is mounted on an inner surface of the second side 138B. The steer and drive unit 132 further comprises a plurality of LM blocks 142A-B. Each LM block from the plurality of LM blocks 142A-B is configured to slide on a corresponding LM rail from the second set of LM rails 140A-B. A first LM block say 142A (also referred as LM block and interchangeably used herein) is configured to slide on the LM rail 140A and the second LM block say 142B (also referred as LM block and interchangeably used herein) is configured to slide on the LM rail 140B, in an embodiment of the present disclosure.

The steer and drive unit 132 further comprises a first rack 144A and a second rack 144B mounted on a corresponding LM block. For instance, the first rack 144A is mounted on the LM block 142A and the second rack is mounted on the LM block 142B.

The steer and drive unit 132 further comprises a driver pinion 146. The driver pinion 146 is positioned at the center and in between the first rack 144A and the second rack 144B (e.g., refer FIG. 5 for position of the driver pinion 146) and is driven is by a motor 148.

The steer and drive unit 132 further comprises a first driven pinion 150A and a second driven pinion 150B. The first driven pinion 150A and the second driven pinion 150B are positioned in between the first rack 144A and the second rack 144B such that the first driven pinion 150A and the second driven pinion 150B are on either side of the driver pinion 146. In other words, the first driven pinion 150A is at one side of the driven pinion 146 and the second driven pinion 150B is at another side of the driven pinion 146 as shown in FIG. 5.

The motor 148 is configured to (i) rotate the driver pinion 146, the first driven pinion 150A and the second driven pinion 150B in at least one direction, (ii) enable a plurality of drive wheels 152A-B attached to the first driven pinion 150A and the second driven pinion 152B to rotate in the at least one direction. The at least one direction is one of a clockwise direction or an anti-clockwise direction.

In other words, if the motor 148 rotates the driver pinion 146, the first driven pinion 150A and the second driven pinion 150B in a clockwise direction then the plurality of drive wheels 152A-B attached to the first driven pinion 150A and the second driven pinion 152B also rotate in the same clockwise direction. Similarly, if the motor 148 rotates the driver pinion 146, the first driven pinion 150A and the second driven pinion 150B in an anti-clockwise direction then the plurality of drive wheels 152A-B attached to the first driven pinion 150A and the second driven pinion 152B also rotate in the same anti-clockwise direction. Further, each of the plurality of drive wheels 152A-B may be controlled and operated by a corresponding motor attached therein as depicted in FIG. 5. The corresponding motor operatively attached/connected to each of the plurality of drive wheels 152A-B is shown within an oval shaped broken line representation. It is to be understood by a person having ordinary skill in the art or person skilled in the art that though there are 2 motors shown for operating the 2 drive wheels, such arrangement shall not be construed as limiting the scope of the present disclosure. In other words, only 1 motor may be configured or operatively coupled to both the drive wheels and accordingly driven for operation/navigation and rotation. Similarly, it is to be understood by a person having ordinary skill in the art or person skilled in the art that though the lead screw mechanism may also be driven by a corresponding motor or with the help of existing motor depicted in FIGS. Such arrangement shall not be construed as limiting the scope of the present disclosure.

The steer and drive unit 132 further comprises a plurality of suspension units 154A-N. Each suspension unit from the plurality of suspension units 154A-N is configured to provide suspension for the plurality of drive wheels 152A-B during navigation of the ACFTAMR 100. The plurality of suspension units 154A-N are provided on both sides of the steer and drive unit 132 where they are mounted on a plate which are positioned above the drive wheels 152A-B. It is to be understood by a person having ordinary skill in the art of person skilled in the art, that whether when the payload is lifted or not by the ACFTAMR 100, the plurality of suspension units 154A-N still provide suspension for the plurality of drive wheels 152A-B (e.g., during a standstill condition) thus enabling better stability and balance. The above components and their configuration and functionalities may be better understood by the following illustrative description.

The driver pinion 146 rotates and transmits motion to one or more racks 144A-B mounted on the LM blocks 142A-B and the LM rails 140A-B. These racks 144A-B further drive two set of driven pinions 150A-B mounted on a suspension shaft coupled to shaft support and mounted on the mounting block 136. These two sets of suspension shaft form a plurality of suspension units to which the plurality of drive wheels unit is mounted from the bottom. In an embodiment, the suspension units are suspension springs which are in between the LM blocks and the drive wheel unit, and thus are enable isolation of the drive wheel unit from the chassis assembly thereby providing independent suspension to each drive wheel. This further provides flexibility to drive wheel unit to move up and down (approximately +/−30 mm) which allows drive wheels to move on bump or ditch with ease. Rotation of the driven pinion enables rotation of drive wheels thus forming steering of the ACFTAMR 100 for navigation. The drive wheels can rotate +/−90 degree. Such rotation shall not be construed as limiting the scope of the present disclosure. With these set of drive wheels ACFTAMR 100 can move in either direction (e.g., forward, backward, sidewise, curved path, and the like). The drive wheels also provide traction to the ACFTAMR 100, in an embodiment of the present disclosure.

The ACFTAMR 100 further comprises a battery unit 156 mounted on the chassis assembly 102. The battery unit 156 is configured to accommodate a battery 154 for providing power to the adjustable counterweight-based fork type autonomous mobile robot (ACFTAMR) 100.

The battery unit 156 comprises a plurality of stand-offs 158A-D. Each stand-off comprises a first end 160A and a second end 160B. The first end 160A of each stand-off is connected to a corresponding corner point of the battery unit 156. The battery unit 156 further comprises a first support link 162A connected to the second end 1606 of a first stand-off 158A and a second stand-off 158B of the plurality of stand-offs 158A-D. A second support link 162B is connected to the second end 1606 of a third stand-off 158C and a fourth stand-off 158D of the plurality of stand-offs 158A-D.

The battery unit 156 further comprises a first L-shaped guide 164A and a second L-shaped guide 164B. Each of the first L-shaped guide 164A and the second L-shaped comprise 164B comprises a first end 166A and a second end 166B. The first end 166A of the first L-shaped guide 164A and the second L-shaped 164B is fixed to a corresponding corner plate mounted on the chassis assembly 102.

Figure 6A:
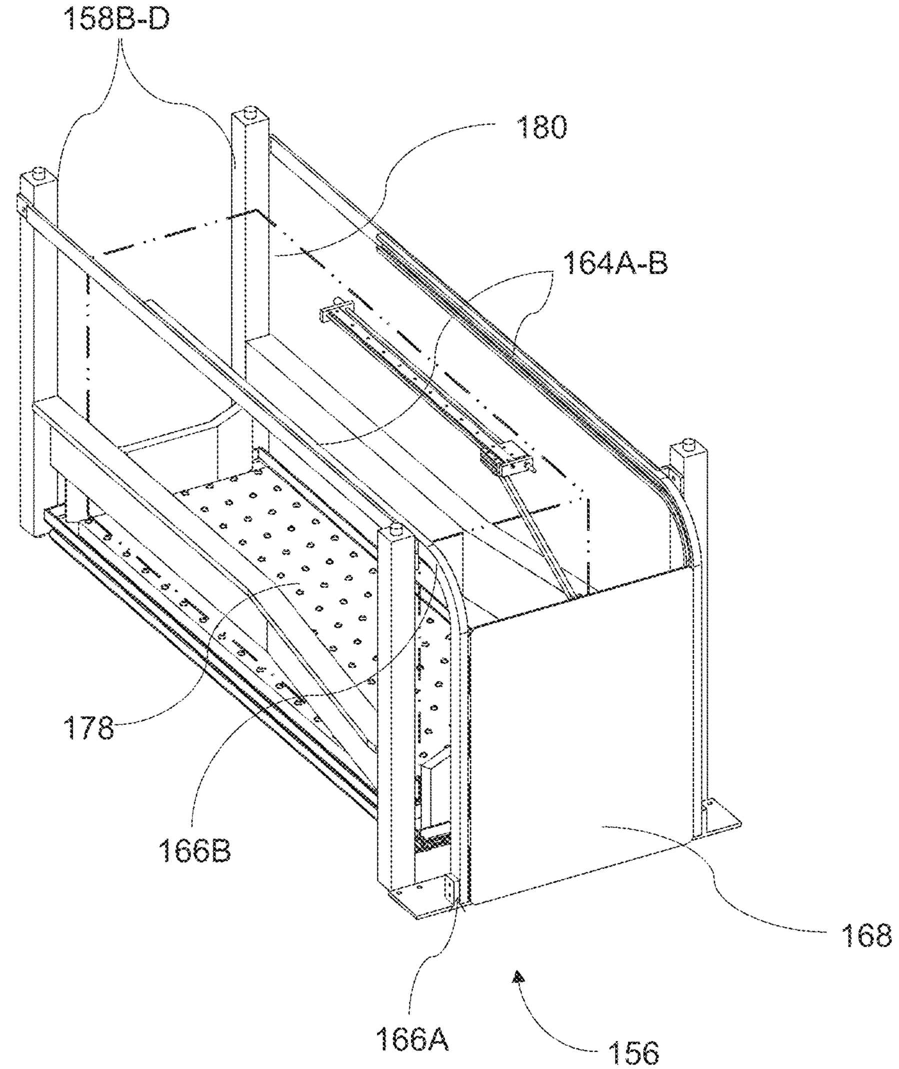
FIG. 6A depicts a battery unit comprised in the ACFTAMR illustrating a sliding door in a closed position, in accordance with an embodiment of the present disclosure.
Figure 6B:
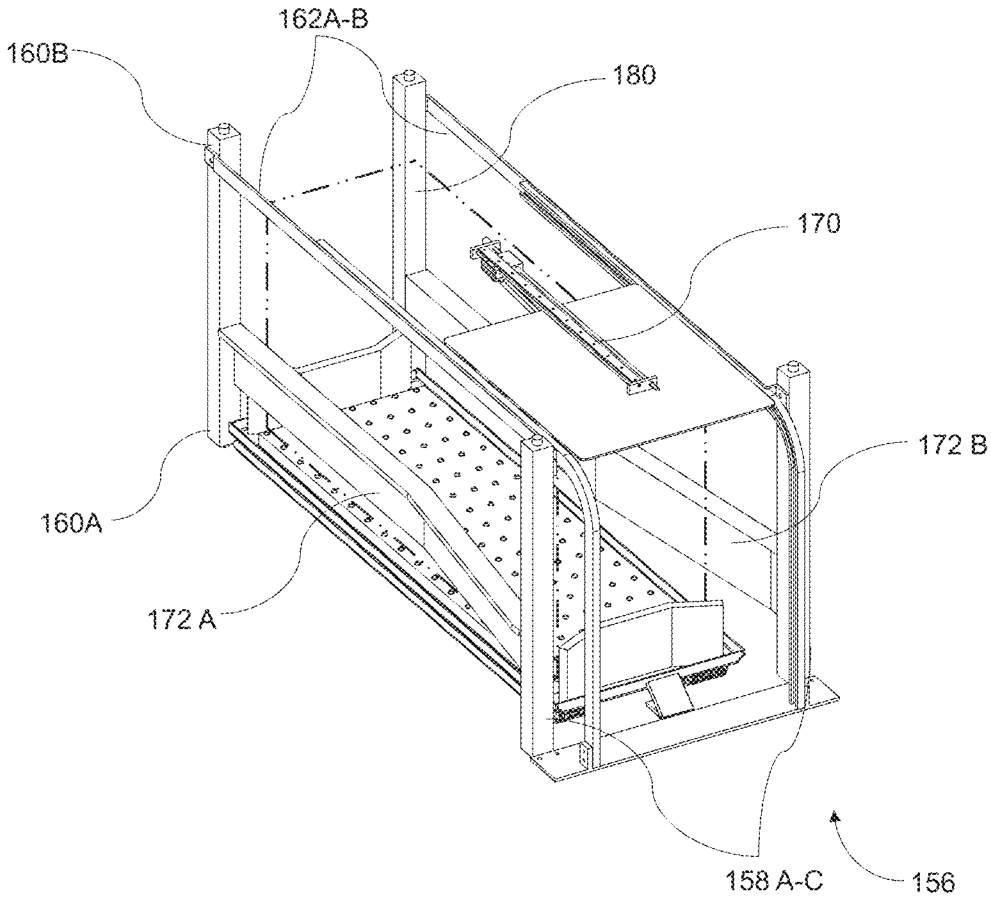
FIG. 6B depicts the battery unit comprised in the ACFTAMR illustrating the sliding door in an open position, in accordance with an embodiment of the present disclosure.

The battery unit 156 further comprises a sliding door 168 that is operated by a positioning actuator 170. The battery unit 156 further comprises a first battery aligning component 172A and a second battery aligning component 172B. Each of the first battery aligning component 172A and the second battery aligning component 172B comprising a first portion 174A and a second portion 174B. The first portion 174A of the first battery aligning component 172A and the second battery aligning component 172B is connected to the first stand-off 158A and the third stand-off 158C respectively. Similarly, the second portion 174B of the first battery aligning component 172A and the second battery aligning component 172B is connected to the second stand-off 1586 and the fourth stand-off 158D to form a tapered area. The first portion 174A and the second portion 174B form like a Y-structure wherein the upper portion of the Y-structure which appears as a V-shaped is referred to as the tapered area. FIGS. 6A and 6B, with reference to FIGS. 1A through 5, depict the battery unit 156 comprised in the ACFTAMR 100, in accordance with an embodiment of the present disclosure. More specifically, FIG. 6A depicts the battery unit 156 with the sliding door 168 in a closed position, in accordance with an embodiment of the present disclosure. In other words, FIG. 6A depicts 156 battery unit comprised in the ACFTAMR 100 illustrating the sliding door 168 in a closed position, in accordance with an embodiment of the present disclosure. FIG. 6B depicts the battery unit 156 with the sliding door 168 in an open closed position, in accordance with an embodiment of the present disclosure. In other words, FIG. 6A depicts the battery unit 156 comprised in the ACFTAMR 100 illustrating the sliding door 168 in an open position, in accordance with an embodiment of the present disclosure.

Figure 7:
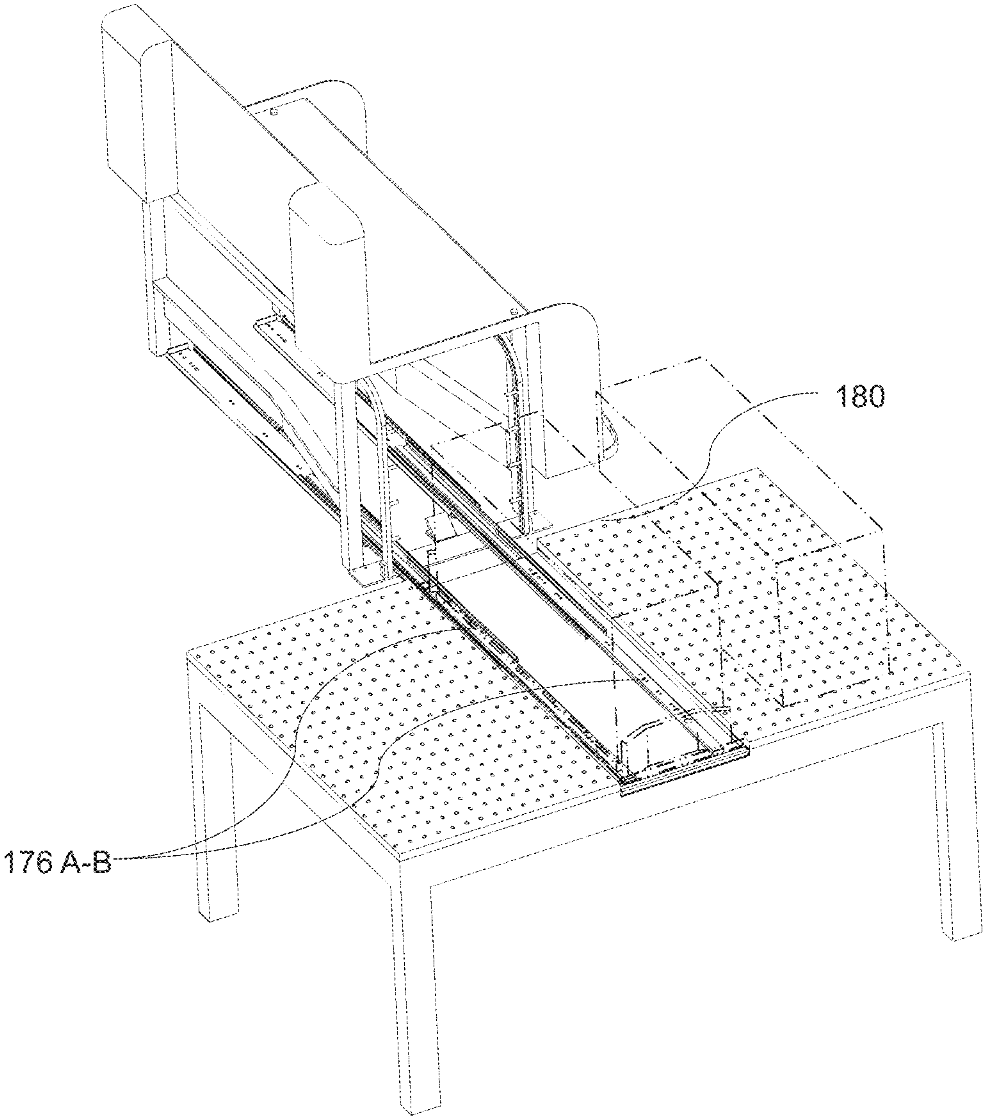
FIG. 7 depicts a portion of the ACFTAMR with the battery unit illustrating battery replacement, in accordance with an embodiment of the present disclosure.

The battery unit 156 further comprises a plurality of telescopic rails 176A-B wherein each of the plurality of telescopic rails is connected to the chassis assembly 102. The battery unit 156 further comprises a ball plate 178 that is mounted on the plurality of telescopic rails 176A-B connected to the chassis assembly 102. Each of the plurality of telescopic rails 176A-B is configured to provide a guided pathway for the ball plate 178 to enable a battery 180 to slide inside or outside of the battery unit 156 via the formed tapered area. FIG. 7, with reference to FIGS. 1A through 6B, FIG. 7 depicts a portion of the ACFTAMR 100 with the battery unit 156 illustrating battery replacement, in accordance with an embodiment of the present disclosure. More specifically, the sliding door 168 is configured to (i) slide through the first L-shaped guide 164A and the second L-shaped 164B for open and close of the battery unit 156. In an embodiment, the sliding door 168 serves as a shutter for replacement of the battery 156 or for performing any maintenance being identified.

The ACFTAMR 100 further comprises a plurality of swivel wheels at the bottom for enabling navigation during the operation of the apparatus. Such functionalities of the swivel wheels can be realized as known in the art. In addition to the above functionalities, each swivel wheel from the plurality of swivel wheels is further configured to enable forward and backward movement of the counterbalance shafts in a smooth manner. For instance, as depicted in FIGS. 1A through 1C and FIGS. 3A and 3B, there are 4 swivel wheels are realized and implemented by the ACFTAMR 100. The ACFTAMR 100 may further comprise a plate/connecting means like component which enables the swivel wheels to connect with corresponding ends of the corresponding countershafts and at bottom end/side of the counterweight assembly or the counterweight itself. Additionally, the ACFTAMR 100 may comprises a sensor feedback for controlled movement of the one or more corresponding components to lift a payload placed on a pallet. The ACFTAMR 100 are further equipped with contact and vision sensors that enable the ACFTAMR 100 to determine whether there is any offset or any contact between surfaces of the ACFTAMR 100 and the pallet. With the help of vision sensors, the forks capture image data (or sensor data) of object(s) (e.g., surrounding object(s) during navigation, size of payload, and pallet, etc.). Such sensor data can be in the form of 2-dimensional (2D) sensor data and/or 3-dimensional (3D) sensor data that is captured from a distance. The captured sensor data enables the ACFTAMR 100 to correct its offset and/or compute a mode of approach to handle the payload. The mode of approach, for instance, shall include, navigating angle, sliding through pallet/roller cages, and the like.

Traditional counterweight fork type AMR can be used for any kind of pallet. But the challenge is it occupies lot more maneuvering space while making a 90 degree turn. This cannot work in narrow spaces. Hence fork over AMR is preferred for its compactness of chassis and hence has better maneuverability even in tight spaces. Challenge in fork over AMR, since it has extended part of the fork always touching the ground and thus cannot work for pallets with a wooden plank (Stringer) at the bottom of the fork opening in the pallet. To overcome the above technical problems, embodiments of the present disclosure provide an Adjustable Counterweight-based Fork Type Autonomous Mobile Robot (ACFTAMR) which comprises of chassis assembly and vertical mast (e.g., the mast unit as depicted in FIGS.), a horizontal cross slide mechanism and forks. The chassis assembly as comprised in the apparatus 100 has front counterweight chassis and main chassis interconnected with sliding mechanism. The front counterweight chassis has a set of swivel wheels and at bottom has two extended arms towards the rear on either side. The rear ends of these two extended arms have additional swivel counterbalance wheels. The main chassis contains two differential drive wheels. The rear side of the main chassis is mounted with vertical mast (or the mast unit) and has a unique bridge connection to have a cross slide mechanism. Also, each arm of the cross-slide unit contains individual fork arrangement (e.g., refer forks as depicted in FIGS.). When bare vehicle or loaded apparatus 100 is traveling it achieves compactness in terms of the chassis assembly wherein during maneuvering of the apparatus 100 is compact and when lifting the pallet/payload with stringer in bottom. Further the apparatus 100 enables the chassis assembly and the counterweight assembly to move apart for providing sufficient balance and stability for pickup and release of the payload to a desired location.

Unlike the traditional AMRs, the apparatus/ACFTAMR 100 of the present disclosure/application has the two drive wheels as depicted in FIGS and without steering in action these two drive wheels can work as differential drive (wherein one of the drive wheels can move forward direction and another drive wheel can move in backward direction to create a zero (0) turning radius) and are able to rotate about the center. When steering is turned at 90 degrees, the apparatus 100 can move cross wise. At any other orientation angle of steering, the apparatus 100 can move in that specific angular direction. This level of flexibility gives better advantage of maneuverability to the ACFTAMR 100.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. An adjustable counterweight-based fork type autonomous mobile robot (ACFTAMR), comprising:

a chassis assembly;

a mast unit that is held by the chassis assembly, wherein the mast unit comprises:

a fork mount comprising a first end and a second end, wherein the fork mount is configured to accommodate a plurality of forks using a plurality of fasteners at each of the first end and the second end;

a first vertical plate and a second vertical plate;

a first set of Liner Motion (LM) rails mounted on the first vertical plate and the second vertical plate respectively;

a vertical lead screw mechanism comprising a first end and a second end, wherein the first end of the vertical lead screw mechanism is connected to the fork mount, and wherein the vertical lead screw mechanism is configured to drive the fork mount in at least one of a first direction and a second direction;

a counterweight assembly comprising a first end and a second end, each of the first end and the second end of the counterweight assembly comprises a plurality of cutouts, wherein the counterweight assembly comprises:

a first pair of counterbalance shafts and a second pair of counterbalance shafts, wherein each counterbalance shaft from the first pair and the second pair of counterbalance shafts comprises a corresponding flange, wherein each corresponding cutout from the plurality of cutouts is configured to accommodate the corresponding flange, wherein during a pickup of a payload by the plurality of forks, (i) the first pair and the second pair of counterbalance shafts are configured to change from a first position to a second position, (ii) upon the plurality of the first pair and the second pair of counterbalance shafts changing from the first position to the second position, each of the plurality of forks is configured to slide through a corresponding fork assembly receiver of the payload, and (iii) the fork mount is driven from the first direction to the second direction via the first set of Liner Motion (LM) rails, for lifting the payload by the plurality of forks, and wherein upon lifting the payload on the plurality of forks, the first pair and the second pair of counterbalance shafts are configured to change from the second position to the first position and the ACFTAMR is operated for navigation to a desired location; and a battery unit mounted on the chassis assembly, wherein the battery unit is configured to accommodate a battery for providing power to the adjustable counterweight-based fork type autonomous mobile robot (ACFTAMR), and wherein the battery unit comprises:

a plurality of stand-offs, wherein each stand-off comprises a first end and a second end, wherein the first end of each stand-off is connected to a corresponding corner point of the battery unit;

a first support link connected to the second end of a first stand-off and a second stand-off of the plurality of stand-offs;

a second support link connected to the second end of a third stand-off and a fourth stand-off of the plurality of stand-offs;

a first L-shaped guide and a second L-shaped guide, each of the first L-shaped guide and the second L-shaped comprise comprises a first end and a second end, wherein the first end of the first L-shaped guide and the second L-shaped is fixed to a corresponding corner plate mounted on the chassis assembly;

a sliding door operated by a positioning actuator, wherein the sliding door is configured to (i) slide through the first L-shaped guide and the second L-shaped for open and close of the battery unit; and a first battery aligning component and a second battery aligning component, each of the first battery aligning component and the second battery aligning component comprising a first portion and a second portion, wherein the first portion of the first battery aligning component and the second battery aligning component is connected to the first stand-off and the third stand-off respectively, and wherein the second portion of the first battery aligning component and the second battery aligning component is connected to the second stand-off and the fourth stand-off to form a tapered area.

2. The adjustable counterweight-based fork type autonomous mobile robot (ACFTAMR) of claim 1, wherein the vertical lead screw mechanism is equidistantly positioned between the first vertical plate and the second vertical plate.

3. The adjustable counterweight-based fork type autonomous mobile robot (ACFTAMR) of claim 1, wherein when the payload is to be released from the plurality of forks to the desired location, (i) the first pair and the second pair of counterbalance shafts are configured to change from the first position to the second position, and (ii) the fork mount is driven from the second direction to the first direction.

4. The adjustable counterweight-based fork type autonomous mobile robot (ACFTAMR) of claim 1, further comprising a steer and drive unit comprising:

a mounting block having a first side and a second side;

a second set of LM rails, each LM rail of the second set of LM rails is mounted on an inner surface of the first side and the second side respectively;

a plurality of LM blocks, each LM block from the plurality of LM blocks is configured to slide on a corresponding LM rail from the second set of LM rails;

a first rack and a second rack mounted on a corresponding LM block; a driver pinion positioned at the center and in between the first rack and the second rack, and driven is by a motor; and a first driven pinion and a second driven pinion, each of the first driven pinion and the second driven pinion positioned in between the first rack and the second rack such that the first driven pinion and the second driven pinion are on either side of the driver pinion.

5. The adjustable counterweight-based fork type autonomous mobile robot (ACFTAMR) of claim 4, wherein the motor is configured to (i) rotate the driver pinion, the first driven pinion and the second driven pinion in at least one direction, (ii) enable a plurality of drive wheels attached to the first driven pinion and the second driven pinion to rotate in the at least one direction.

6. The adjustable counterweight-based fork type autonomous mobile robot (ACFTAMR) of claim 5, wherein the steer and drive unit further comprises a plurality of suspension units, wherein each suspension unit from the plurality of suspension units is configured to provide suspension for the plurality of drive wheels during navigation of the ACFTAMR.

7. The adjustable counterweight-based fork type autonomous mobile robot of claim 6, wherein the battery unit further comprises:

a plurality of telescopic rails connected to the chassis assembly; and a ball plate mounted on the plurality of telescopic rails connected to the chassis assembly, wherein each of the plurality of telescopic rails is configured to provide a guided pathway for the ball plate to enable the battery to slide inside or outside of the battery unit via the formed tapered area.

* * * * *